(12) United States Patent
Dondeti et al.

(10) Patent No.: US 12,190,914 B2
(45) Date of Patent: Jan. 7, 2025

(54) SYSTEM AND METHOD FOR EXTRACTING OBJECTS FROM VIDEOS IN REAL-TIME TO CREATE VIRTUAL SITUATIONS

(71) Applicants: Lakshminath Reddy Dondeti, San Jose, CA (US); Vidya Narayanan, San Jose, CA (US)

(72) Inventors: Lakshminath Reddy Dondeti, San Jose, CA (US); Vidya Narayanan, San Jose, CA (US)

(73) Assignee: SILVERLABS TECHNOLOGIES INC, San Jose, CA (US)

( * ) Notice: Subject to any disclaimer, the term of this patent is extended or adjusted under 35 U.S.C. 154(b) by 66 days.

(21) Appl. No.: 18/092,929

(22) Filed: Jan. 4, 2023

(65) Prior Publication Data

US 2023/0215471 A1     Jul. 6, 2023

Related U.S. Application Data

(60) Provisional application No. 63/296,504, filed on Jan. 5, 2022.

(51) Int. Cl.

| | |
|---|---|
| *G06V 20/00* | (2022.01) |
| *G06F 3/04845* | (2022.01) |
| *G06V 20/40* | (2022.01) |
| *G06V 30/00* | (2022.01) |
| *G11B 27/036* | (2006.01) |
| *H04N 5/91* | (2006.01) |
| *G06F 3/04842* | (2022.01) |
| *G11B 27/34* | (2006.01) |

(52) U.S. Cl.
CPC ........ *G11B 27/036* (2013.01); *G06F 3/04845* (2013.01); *G06V 20/41* (2022.01); *G06V 20/46* (2022.01); *H04N 5/91* (2013.01); *G06F 3/04842* (2013.01)

(58) Field of Classification Search
CPC .. G06F 3/04842; G06F 3/04845; G06F 3/048; G06V 20/41; G06V 20/46; G06V 20/00; G06V 30/00; G06V 10/00; G06V 10/10; G06V 10/40; G11B 27/036; G11B 27/34; H04N 5/91
USPC ......................... 386/280, 278, 282, 239, 248
See application file for complete search history.

(56) References Cited

U.S. PATENT DOCUMENTS

| | | | |
|---|---|---|---|
| 2002/0099763 A1* | 7/2002 | Kondo ................... | G06Q 30/02 709/201 |
| 2013/0314442 A1* | 11/2013 | Langlotz ................ | G06T 11/00 348/222.1 |

* cited by examiner

*Primary Examiner* — Daquan Zhao

(57) ABSTRACT

Exemplary embodiments of present disclosure are directed towards a system and method for extracting objects from videos in real-time to create virtual situations, comprising a computing device comprises video creating and editing module configured to enable a user to record videos and select frames automatically from the user recorded videos thereby transferring the automatically selected frames from the computing device to a server. The server comprises video processing module configured receive the automatically selected frames thereby detecting and extracting objects from the automatically selected frames and transfer extracted objects to computing device and display the extracted objects to the user. The video creating and editing module configured to place the extracted objects on a new frame automatically and allow the user to reposition extracted objects on new frame and enable the user to customize the background and foreground elements in the new frame to create virtual situations.

28 Claims, 7 Drawing Sheets

SYSTEM AND METHOD FOR EXTRACTING OBJECTS FROM VIDEOS IN REAL-TIME TO CREATE VIRTUAL SITUATIONS

CROSS-REFERENCE TO RELATED APPLICATIONS

This patent application claims priority benefit of U.S. Provisional Patent Application No. 63/296,504, entitled "METHOD AND APPARATUS FOR VIRTUAL SITUATIONS IN VIDEOS USING REAL-TIME OBJECT EXTRACTION", filed on: 5 Jan. 2022. The entire contents of the patent application are hereby incorporated by reference herein in its entirety.

COPYRIGHT AND TRADEMARK NOTICE

This application includes material which is subject or may be subject to copyright and/or trademark protection. The copyright and trademark owner(s) have no objection to the facsimile reproduction by any of the patent disclosure, as it appears in the Patent and Trademark Office files or records, but otherwise reserves all copyright and trademark rights whatsoever.

TECHNICAL FIELD

The disclosed subject matter relates generally to a system and method for extracting objects from videos in real-time to create virtual situations. More particularly, the present disclosure relates to automatically extracting the objects from one or more video frames and inserting them into a new frame with static or moving elements in the background or foreground.

BACKGROUND

Generally, editing videos for producing various special effects is a critical task in many computer graphics applications. For example, consider a movie scene requiring object insertion in a particular frame. The extraction of Objects (humans) in video frames is essential in many multimedia applications. Some existing video editing tools provide the ability to extract objects from photos in near real-time, and some other video editing tools running on laptops, and larger computers allow the extraction of objects from videos in post-production editing environments. However, existing video editing tools may require user intervention to effectively insert objects into video frames to create a new virtual situation. In addition, sometimes existing video editing tools may fail to require object detection and extraction accuracy.

In the light of the aforementioned discussion, there exists a need for a certain system for automatically extracting objects from videos in real-time to create virtual situations with novel methodologies that would overcome the above-mentioned challenges.

SUMMARY

The following invention presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

An objective of the present disclosure is directed towards a system and method for extracting objects from videos in real-time to create virtual situations.

Another objective of the present disclosure is directed towards enabling a user to create or record videos on a computing device.

Another objective of the present disclosure is directed towards enabling a user to select one or more frames from a video.

Another objective of the present disclosure is directed towards extracting objects from the user selected frames automatically.

Another objective of the present disclosure is directed towards enabling the user to choose one or more objects from the extracted objects.

Another objective of the present disclosure is directed towards enabling the user to place the chosen one or more objects in new situations.

Another objective of the present disclosure is directed towards enabling the user to upload offline recorded videos or photos on the computing device.

Another objective of the present disclosure is directed towards replacing the backgrounds of the user created video.

Another objective of the present disclosure is directed towards a system automatically or manually selecting one or more frames from a video.

Another objective of the present disclosure is directed towards extracting objects from the frames, and placing them in new situations.

Another objective of the present disclosure is directed towards extracting human body, animals, and other objects in real-time from one or more frames of a video.

Another objective of the present disclosure is directed towards placing the extracted objects together to place into the new frame of the video.

According to an exemplary aspect of the present disclosure, enabling a user to record one or more videos by a video creating and editing module on a computing device.

According to another exemplary aspect of the present disclosure, displaying a series of frames to the user from one or more user recorded videos by the video creating and editing module.

According to another exemplary aspect of the present disclosure, allowing the user to select one or more frames from the series of frames displayed on the computing device by the video creating and editing module.

According to another exemplary aspect of the present disclosure, transferring the one or more user selected frames from the computing device to a server by the video creating and editing module over a network.

According to another exemplary aspect of the present disclosure, receiving one or more user selected frames by a video processing module enabled in the server.

According to another exemplary aspect of the present disclosure, detecting and extracting one or more objects from one or more user selected frames by the video processing module.

According to another exemplary aspect of the present disclosure, transferring one or more extracted objects to the computing device by the video processing module over the network.

According to another exemplary aspect of the present disclosure, receiving one or more extracted objects by the video creating and editing module and displaying the one or more extracted objects to the user on the computing device.

According to another exemplary aspect of the present disclosure, enabling the user to select a new frame from one or more user recorded videos by the video creating and editing module.

According to another exemplary aspect of the present disclosure, allowing the user to select and place one or more extracted objects into the new frame by the video creating and editing module.

According to another exemplary aspect of the present disclosure, enabling the user to customize background and foreground elements in the new frame by the video creating and editing module.

According to another exemplary aspect of the present disclosure, deleting one or more user selected frames after extracting one or more objects and replacing one or more user selected frames with the new frame by the video creating and editing module.

BRIEF DESCRIPTION OF THE DRAWINGS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

DETAILED DESCRIPTION OF EXAMPLE EMBODIMENTS

Figure 1:
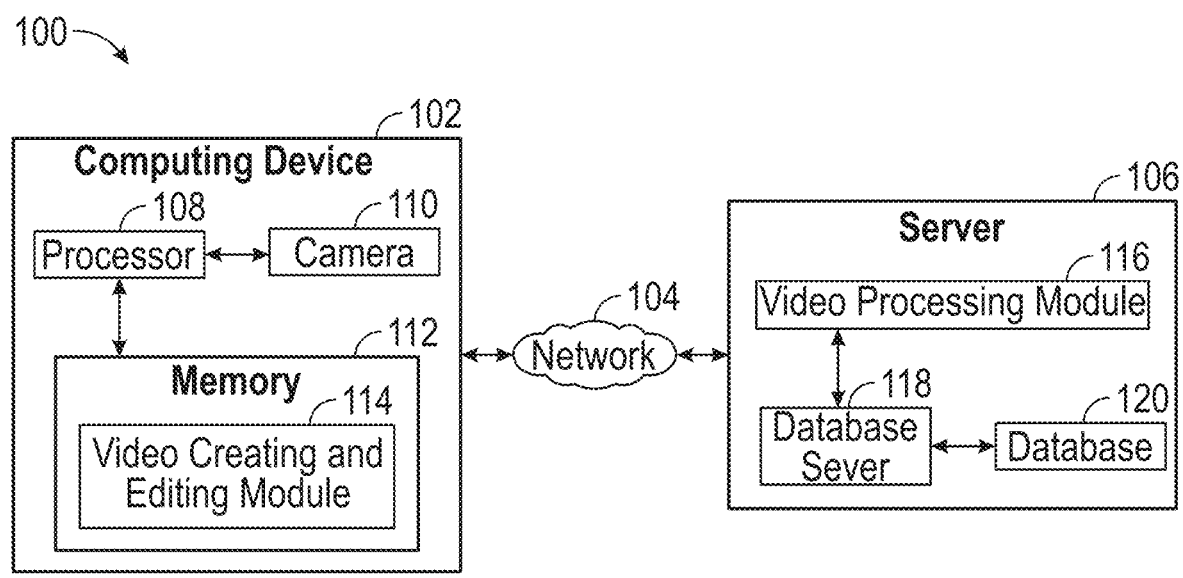
FIG. 1 is a block diagram depicting a schematic representation of a system for extracting objects from videos in real-time to create virtual situations, in accordance with one or more exemplary embodiments.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and so forth, herein do not denote any order, quantity, or importance, but rather are used to distinguish one element from another.

Referring to FIG. 1 is a block diagram 100 depicting a schematic representation of a system for extracting objects from videos in real-time to create virtual situations, in accordance with one or more exemplary embodiments. The system 100 includes a computing device 102, a network 104, a server 106, a processor 108, a camera 110, a memory 112, a video creating and editing module 114, a video processing module 116, a database server 118, and a database 120.

The computing device 102 may include the user's devices. The computing device 102 may include, but is not limited to, a personal digital assistant, smartphones, personal computers, a mobile station, computing tablets, a handheld device, an internet enabled calling device, an internet enabled calling software, a telephone, a mobile phone, a digital processing system, and so forth. The computing device 102 may include the processor 108 in communication with a memory 112. The processor 108 may be a central processing unit. The memory 112 is a combination of flash memory and random-access memory.

The computing device 102 may be communicatively connected with the server 106 via the network 104. The network 104 may include, but not limited to, an Internet of things (IoT network devices), an Ethernet, a wireless local area network (WLAN), or a wide area network (WAN), a Bluetooth low energy network, a ZigBee network, a WIFI communication network e.g., the wireless high speed internet, or a combination of networks, a cellular service such as a 4G (e.g., LTE, mobile WiMAX) or 5G cellular data service, a RFID module, a NFC module, wired cables, such as the world-wide-web based Internet, or other types of networks may include Transport Control Protocol/Internet Protocol (TCP/IP) or device addresses (e.g. network-based MAC addresses, or those provided in a proprietary networking protocol, such as Modbus TCP, or by using appropriate data feeds to obtain data from various web services, including retrieving XML data from an HTTP address, then traversing the XML for a particular node) and so forth without limiting the scope of the present disclosure.

Although the computing device 102 is shown in FIG. 1, an embodiment of the system 100 may support any number of computing devices. The computing device 102 may be operated by the user. The user may include, but not limited to, an individual, a client, an operator, a content creator, and the like. The computing device 102 supported by the system 100 is realized as a computer-implemented or computer-based device having the hardware or firmware, software, and/or processing logic needed to carry out the computer-implemented methodologies described in more detail herein.

In accordance with one or more exemplary embodiments of the present disclosure, the computing device 102 may include the camera 110 may be configured to enable the user to capture the multimedia objects using the processor 108. The multimedia objects may include, but not limited to photos, snaps, short videos, videos, and the like. The computing device 102 may include the video creating and editing module 114 in the memory 112.

The video creating and editing module 114 may be configured to enable the user to create or record videos or upload pre-recorded videos or photos on the computing device 102. The video creating and editing module 114 may be any suitable applications downloaded from GOOGLE PLAY® (for Google Android devices), Apple Inc.'s APP STORE® (for Apple devices), or any other suitable database. The video creating and editing module 114 may be a desktop application which runs on Windows or Linux or any other operating system and may be downloaded from a webpage or a CD/USB stick etc. In some embodiments, the video creating and editing module 114 may be software, firmware, or hardware that is integrated into the computing device 102. The computing devices 102 may present a web page to the user by way of a browser, wherein the webpage comprises a hyper-link may direct the user to uniform resource locator (URL).

The server 106 may include the video processing module 116, the database server 118, and the database 120. The video processing module 116 may be configured to detect the objects from the user created or recorded videos. The video processing module 116 may be configured to automatically extract the detected objects from the user created or recorded videos. The objects may include but not limited to humans, the human body, animals, any other objects, and the like. The video processing module 116 may also be configured to provide server-side functionality via the network 104 to one or more users. The database server 118 may be configured to access the one or more databases. The database 120 may be configured to store user created and recorded videos. The database 120 may also be configured to store interactions between the modules of the video creating and editing module 114, and the video processing module 116.

In accordance with one or more exemplary embodiments of the present disclosure, the computing device 102 may be configured to establish communication with the server 106 over the network 104. The computing device 102 may include the video creating and editing module 114. The video creating and editing module 114 may be configured to enable the user to record one or more videos. The video creating and editing module 114 may be configured to select one or more frames automatically from the one or more user recorded videos. The video creating and editing module 114 may be configured to transfer the one or more automatically selected frames from the computing device 102 to the server 106 over the network 104. The server 104 may include the video processing module 116 configured to receive the one or more automatically selected frames. The video processing module 116 may be configured to detect and extract one or more objects from the one or more automatically selected frames and transfer the one or more extracted objects to the computing device 102 over the network 104. The video creating and editing module 114 may be configured to receive one or more extracted objects and display the one or more extracted objects to the user on the computing device 102. The video creating and editing module 114 may be configured to place the one or more extracted objects on the new frame automatically. The video creating and editing module 114 may be configured to allow the user to reposition the one or more extracted objects on the new frame. The video creating and editing module 114 may be configured to enable the user to customize background and foreground elements in the new frame to create virtual situations.

Figure 2:
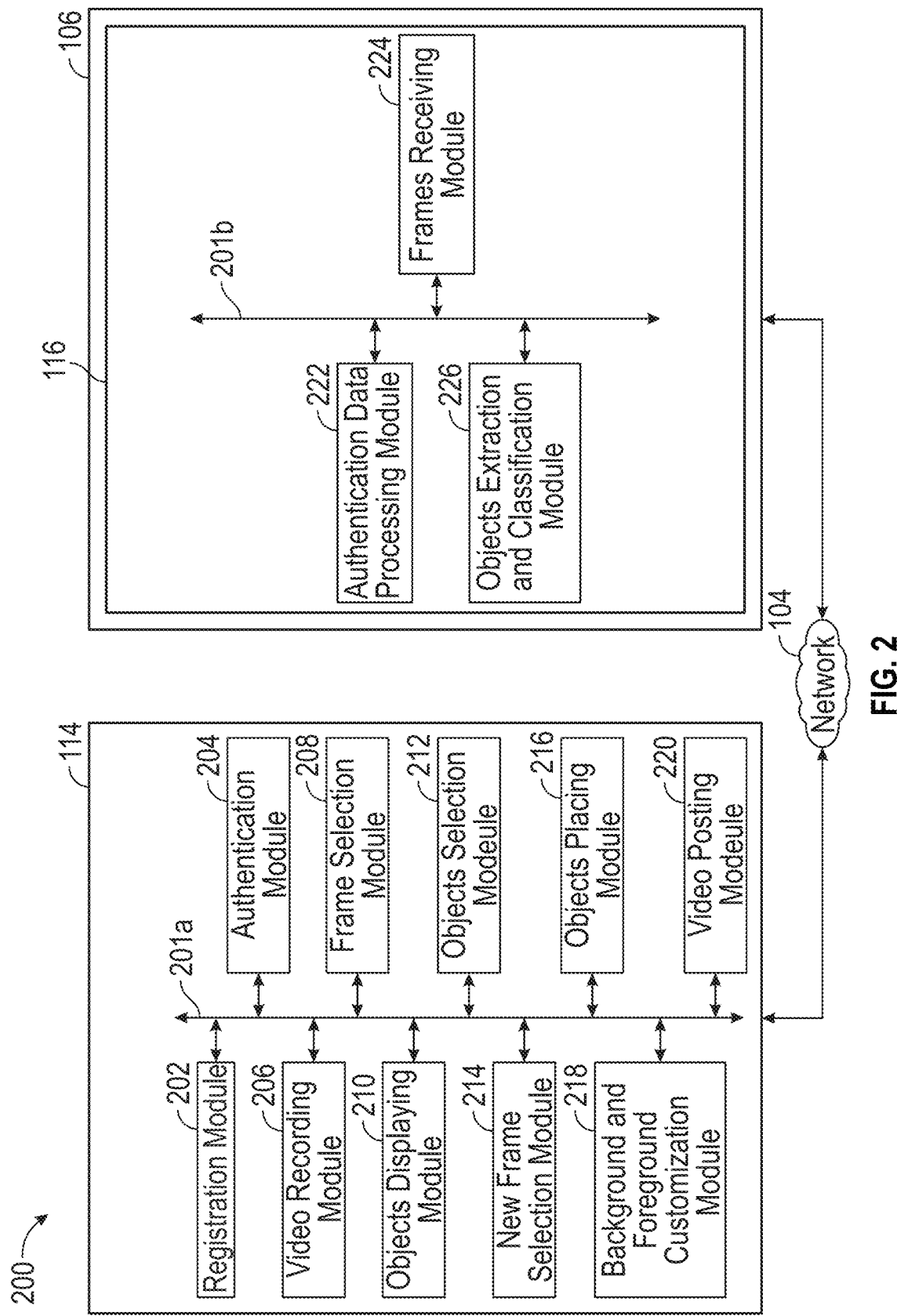
FIG. 2 is a block diagram depicting an embodiment of the video creating and editing module 114 on the computing device and the video processing module 116 on the server of shown in FIG. 1, in accordance with one or more exemplary embodiments.

Referring to FIG. 2 is a block diagram 200 depicting an embodiment of the video creating and editing module 114 on the computing device and the video processing module 116 on the server of shown in FIG. 1, in accordance with one or more exemplary embodiments. The video creating and editing module 114 includes a bus 201a, a registration module 202, an authentication module 204, a video recording module 206, a frame selection module 208, an objects displaying module 210, an objects selection module 212, a new frame selection module 214, an objects placing module 216, a background and foreground customization module 218, and a video posting module 220. The bus 201a may include a path that permits communication among the modules of the video creating and editing module 114 installed on the computing device 102. The term "module" is used broadly herein and refers generally to a program resident in the memory 112 of the computing device 102.

The registration module 202 may be configured to enable the user to register on the video creating and editing module 114 installed on the computing device 102 by providing basic details of the user. The basic details may include but not limited to email, password, first and last name, phone number, address details, and the like. The registration module 202 may also be configured to transfer the user registration details to the server 106 over the network 104. The server 114 may include the video processing module 116. The video processing module 116 may be configured to receive the user registration details from the registration module 202. The authentication module 204 may be configured to enable the user to log in and access the video creating and editing module 114 installed on the computing device 102 by using the user login identity credentials. The video recording module 206 may be configured to enable the user to tap a camera icon to record the video. The video recording module 206 may also be configured to enable the user to upload pre-recorded videos on the computing device 102. The frame selection module 208 may be configured to display a series of frames to the user from the user recorded video. The frame selection module 208 may also be configured to enable the user to select a frame from the series of frames. The frame selection module 208 may also be configured to transfer the user selected frame to the server 106 through the network 104. The frame selection module 208 may also be configured to enable the user to select a new frame from the user recorded one or more videos. The objects displaying module 210 may be configured to receive the extracted objects from the video processing module 116. The objects displaying module 210 may also be configured to display the extracted objects to the user. The objects selection module 212 may be configured to enable the user to select the extracted objects to transfer into the new frame to create a virtual situation. The new frame selection module 214 may be configured to enable the user to select a new frame from the user created video to create new virtual situations in the video. The objects placing module 216 may be configured to enable the user to place the selected objects into the new frame. The background and foreground customization module 218 may be configured to enable the user to customize the background and foreground elements in the new frame. The background and foreground customization module 218 may be configured to enable the user to upload their own assets while customizing the background and foreground elements. The video posting module 220 may be configured to enable the user to post the recorded video on the computing device 102. The video posting module 220 may also be configured to enable the user to post the recorded video with newly created virtual situations in the video. The video posting module 220 may also be configured to enable the user to preview the video with newly created virtual situations before posting on the computing device 102.

In accordance with one or more exemplary embodiments of the present disclosure, the video processing module 116 includes a bus 201b, an authentication data processing module 222, a frames receiving module 224, and an objects extraction and classification module 226. The bus 201b may include a path that permits communication among the modules of the video processing module 116 installed on the sever 106.

The authentication data processing module 222 may be configured to receive the user registration details from the registration module 202. The authentication data processing module 222 may also be configured to generate the user login identity credentials using the user registration details. The identity credentials comprise a unique identifier (e.g., a username, an email address, a date of birth, a house address, a mobile number, and the like), and a secured code (e.g., a password, a symmetric encryption key, biometric values, a passphrase, and the like). The frames receiving module 224 may be configured to receive the user selected frame from the frame selection module 208. The objects extraction and classification module 226 may be configured to detect and extract the objects from the user selected frame. The objects extraction and classification module 226 may also be configured to classify the extracted objects into the appropriate categories. The objects extraction and classification module 226 may also be configured to transfer the extracted objects to the video creating and editing module 114 through the network 104. The objects extraction and classification module 226 may be configured to extract the same objects from multiple frames of the video to create a new situation that has motion in it. The extracted objects may be shrunk or magnified to create out-of-proportion experiences. The objects extraction and classification module 226 may be configured to create duplicate situations and stories. For example, a human may be duplicated and mirrored to appear as if one is looking at oneself in a new situation. The objects extraction and classification module 226 may also be configured to guide the user selected frame by inflection points in a background audio track used in the video. Thereby the objects extraction and classification module 226 allows a visual transition that corresponds to an inflection in sound. The objects extraction and classification module 226 may also be configured to guide the user selected frame by visual changes in the video itself, for example, a pause after a dance move.

In accordance with one or more exemplary embodiments of the present disclosure, one or more videos may be automatically or manually mixed together before or after object extraction to bring new situations that involve multiple objects that are present in separate videos. Using this method, two or more people who have appeared in separate videos may come together in the new situation created in the combined video. Examples of such virtual situations include things like two or more people walking the streets of Paris together, a human appearing next to an animal, and many more.

In accordance with one or more exemplary embodiments of the present disclosure, the video creating and editing module 114 may be configured to select the one or more frames automatically from the one or more user recorded videos to create virtual situations on the computing device 102 without the cloud server. In accordance with one or more exemplary embodiments of the present disclosure, the extracted objects may include a human body, animals, and other objects in real-time from one or more frames of the video. In accordance with one or more exemplary embodiments of the present disclosure, the new frame may include a movie poster, a movie scene, a movie song ending, movie trailers, video memes, brand interactions, and virtual landscapes.

Figure 3:
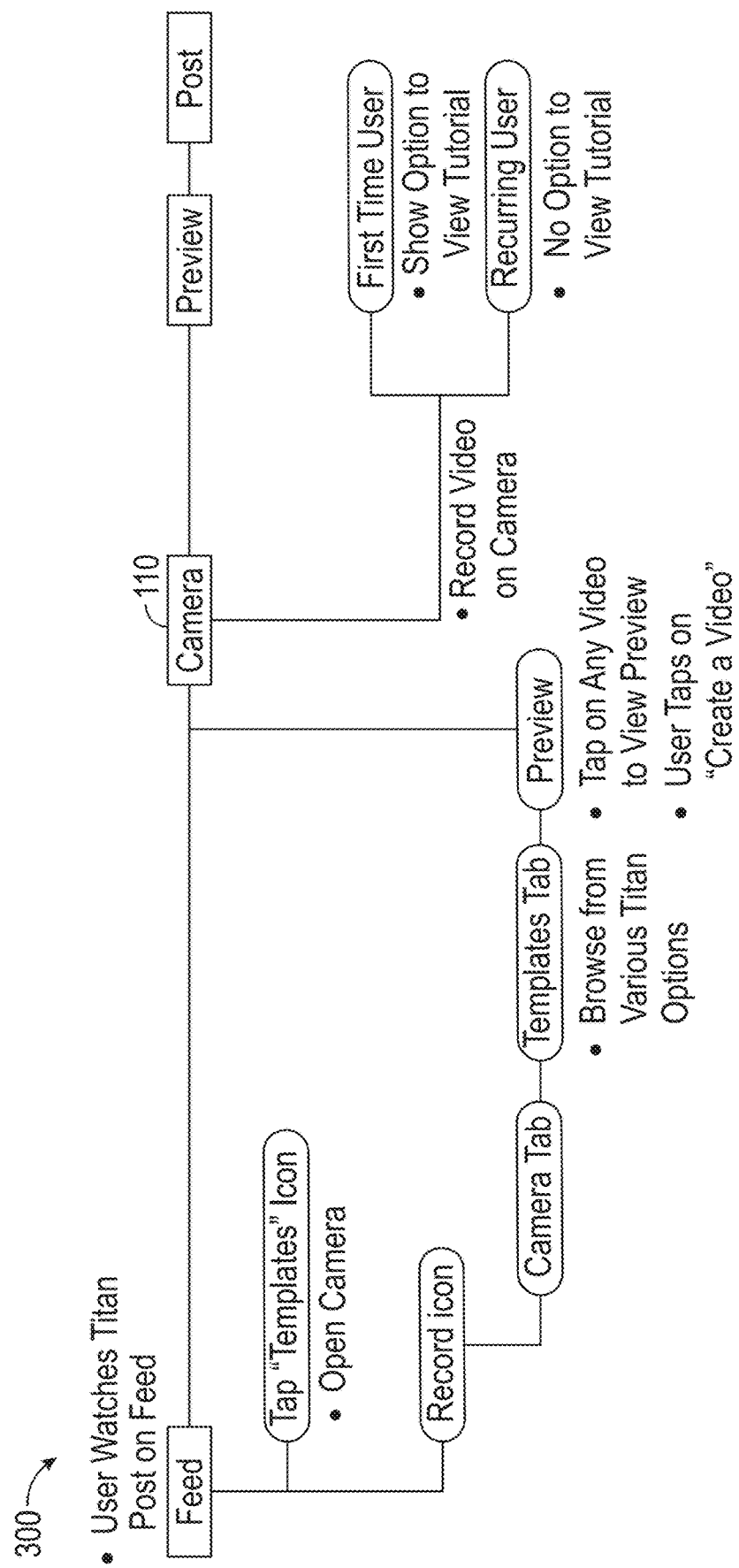
FIG. 3 is a block diagram depicting the system for extracting objects from videos in real-time to create virtual situations, in accordance with one or more exemplary embodiments.

Referring to FIG. 3 is a block diagram 300 depicting the system for extracting objects from videos in real-time to create virtual situations, in accordance with one or more exemplary embodiments. The video creating and editing module 114 may be configured to enable the user to log in or signup to the video creating and editing module on the computing device by providing user details. The video creating and editing module 114 may also be configured to send the request to check the user details from the computing device to the server. The video processing module 116 may be configured to receive the request to check the user details. The video processing module 116 may also be configured to determine whether the user is an existing user or not. The video processing module 116 may also be configured to enable the existing user directly to access the video creating and editing module 114 to create the virtual situations. The video processing module 116 may also be configured to enable the new user to watch a tutorial for creating virtual situations.

Figure 4:
FIG. 4 are example screens depicting a video creating and editing module, in accordance with one or more exemplary embodiments.

Referring to FIG. 4 are example screens 400 depicting a video creating and editing module, in accordance with one or more exemplary embodiments. The screens 400 includes multimedia screens 402a, 402b, 402c, 402d, 402e, 402f, 402g, 402h, 402, 402i, 402j, 402k, 402l, 402m, 402n, and 402o. The screens 402a, 402b, 402c, 402d, 402e, 402f, 402g, 402h, 402, 402i, 402j, 402k, 402l, 402m, 402n, and 402o depicts new virtual situations in one or more videos. video creating and editing module configured to enable a user to record one or more videos. The video creating and editing module may be configured to display a series of frames to the user from one or more user recorded videos and allow the user to select one or more frames from the series of frames, the video creating and editing module configured to transfer the one or more user selected frames from the computing device to a server over a network. The server comprises a video processing module configured to receive one or more user selected frames. The video processing module may be configured to detect and extract one or more objects from one or more user selected frames and transfer one or more extracted objects to the computing device over the network. The video creating and editing module may be configured to receive one or more extracted objects and display the one or more extracted objects to the user on the computing device, the video creating and editing module may be configured to enable the user to select a new frame from the one or more user recorded videos and allow the user to select and place the one or more extracted objects into the new frame, the video creating and editing module configured to enable the user to customize background and foreground elements in the new frame, the video creating and editing module configured to delete the one or more user selected frames after extracting the one or more objects and replace one or more user selected frames with the new frame.

Figure 5:
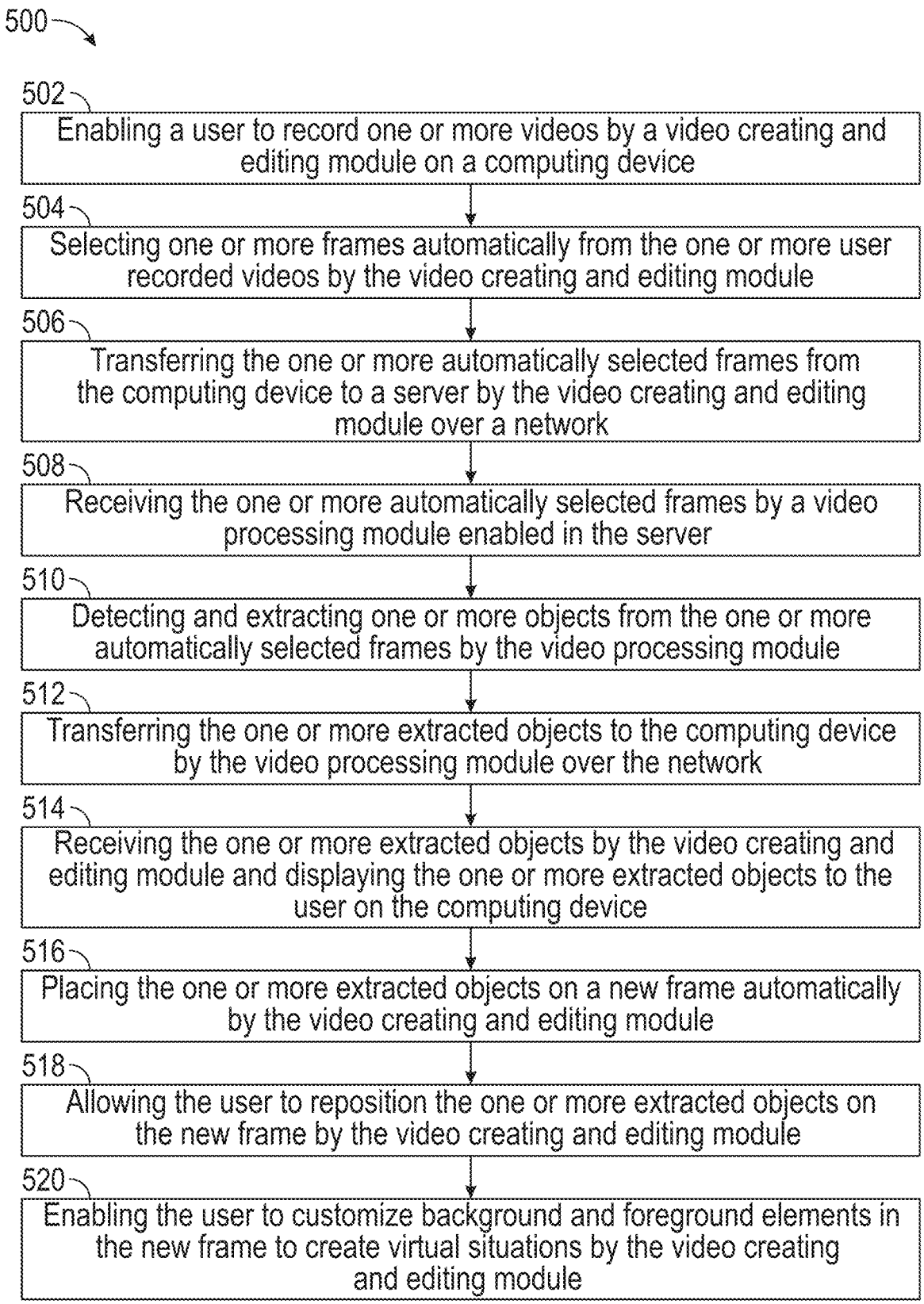
FIG. 5 is a flow diagram depicting a method for extracting objects from videos in real-time to create virtual situations, in accordance with one or more exemplary embodiments.

Referring to FIG. 5 is a flow diagram 500 depicting a method for extracting objects from videos in real-time to create virtual situations, in accordance with one or more exemplary embodiments. The method 500 may be carried out in the context of the details of FIG. 1, FIG. 2, FIG. 3, and FIG. 4. However, the method 500 may also be carried out in any desired environment. Further, the aforementioned definitions may equally apply to the description below.

The method commences at step 502, enabling the user to record one or more videos by the video creating and editing module on the computing device. Thereafter at step 504, selecting one or more frames automatically from the one or more user recorded videos by the video creating and editing module. Thereafter at step 506, transferring the one or more automatically selected frames from the computing device to the server by the video creating and editing module over a network. Thereafter at step 508, receiving the one or more automatically selected frames by the video processing module enabled in the server. Thereafter at step 510, detecting and extracting one or more objects from the one or more automatically selected frames by the video processing module. Thereafter at step 512, transferring the one or more extracted objects to the computing device by the video processing module over the network. Thereafter at step 514, receiving the one or more extracted objects by the video creating and editing module and displaying the one or more extracted objects to the user on the computing device. Thereafter at step 516, placing the one or more extracted objects on the new frame automatically by the video creating and editing module. Thereafter at step 518, allowing the user to reposition the one or more extracted objects on the new frame by the video creating and editing module. Thereafter at step 520, enabling the user to customize background and foreground elements in the new frame to create virtual situations by the video creating and editing module.

Figure 6:
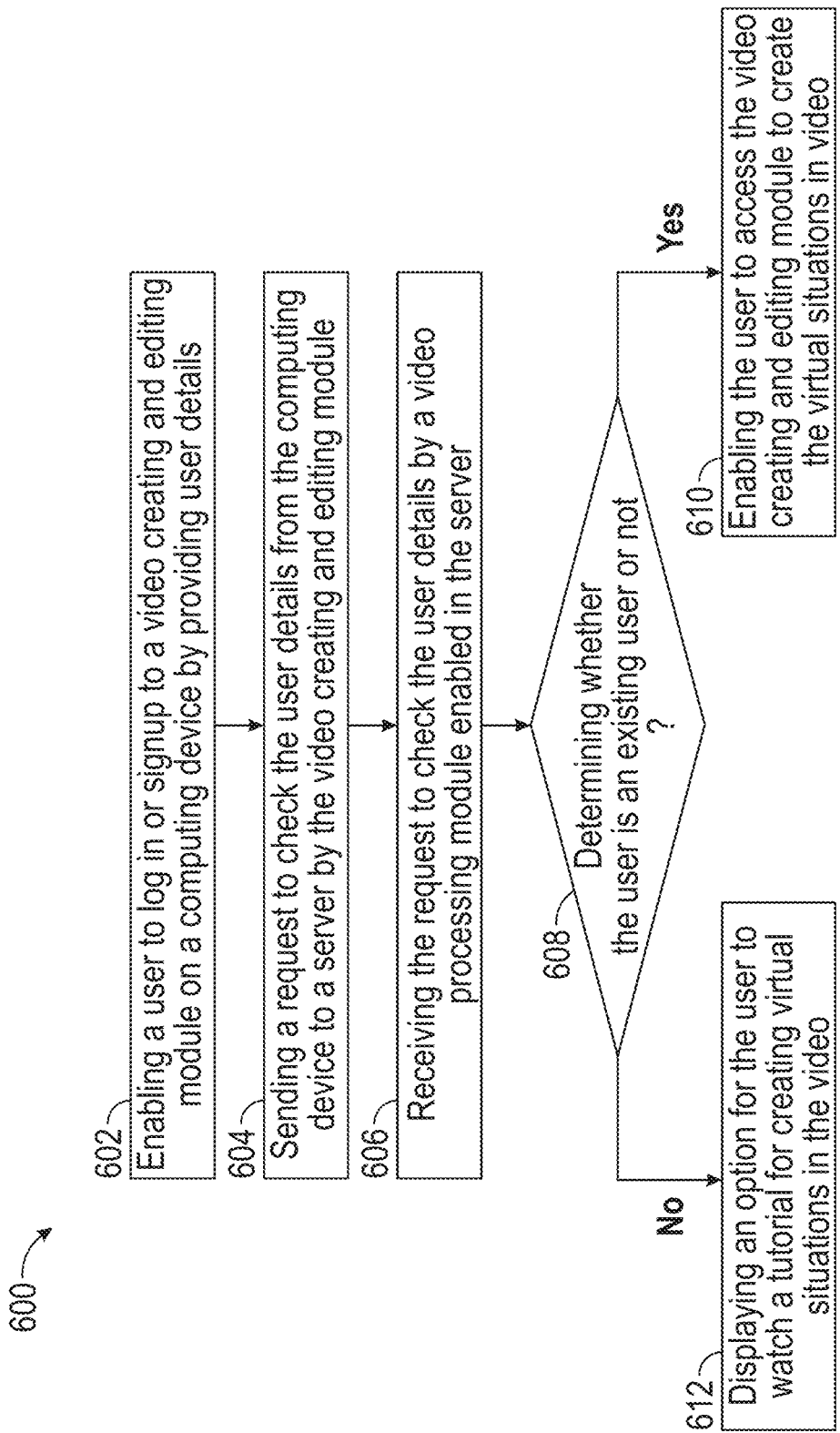
FIG. 6 is a flowchart depicting an exemplary method for enabling a user to access the video creating and editing module to create the virtual situations, in accordance with one or more exemplary embodiments.

Referring to FIG. 6 is a flowchart 600 depicting an exemplary method for enabling a user to access the video creating and editing module to create the virtual situations, in accordance with one or more exemplary embodiments. The method 600 may be carried out in the context of the details of FIG. 1, FIG. 2, FIG. 3, FIG. 4, and FIG. 5. However, the method 600 may also be carried out in any desired environment. Further, the aforementioned definitions may equally apply to the description below.

The method commences at step 602, enabling the user to log in or signup to a video creating and editing module on a computing device by providing user details. Thereafter at step 604, sending the request to check the user details from the computing device to the server by the video creating and editing module. Thereafter at step 606, receiving the request to check user details by the video processing module enabled in the server. Determining whether the user is an existing user or not, at step 608. If answer at step 608 is Yes, the method continues at step 610, enabling the user to access the video creating and editing module to create the virtual situations in the video. If answer at step 608 is No, the method continues at step 612, displaying an option for the user to watch the tutorial for creating virtual situations in the video.

Figure 7:
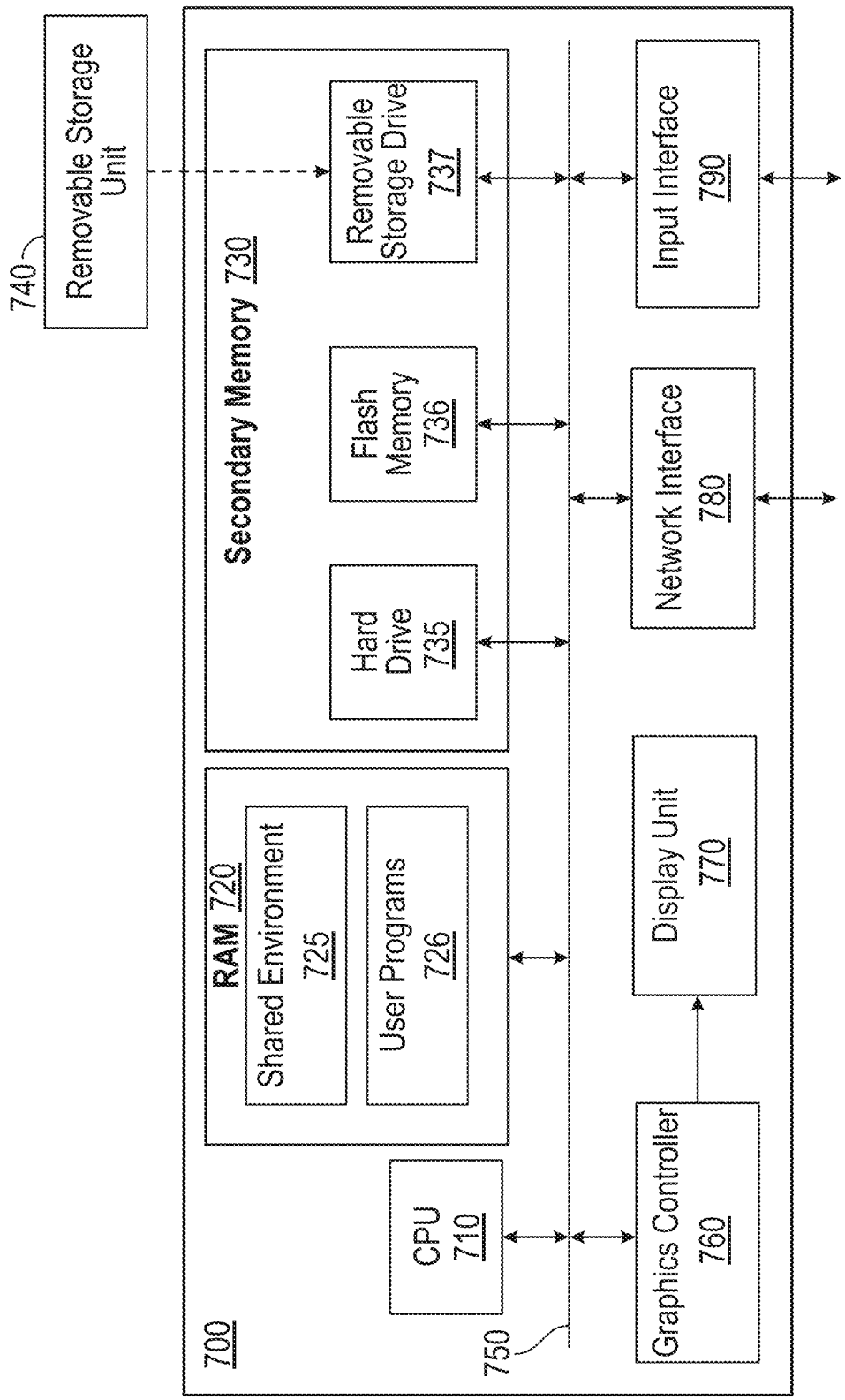
FIG. 7 is a block diagram illustrating the details of a digital processing system in which various aspects of the present disclosure are operative by execution of appropriate software instructions.

Referring to FIG. 7 is a block diagram 700 illustrating the details of a digital processing system 700 in which various aspects of the present disclosure are operative by execution of appropriate software instructions. The Digital processing system 700 may correspond to the computing device 102 (or any other system in which the various features disclosed above can be implemented).

Digital processing system 700 may contain one or more processors such as a central processing unit (CPU) 710, random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present disclosure. CPU 710 may contain multiple processing units, with each processing unit potentially being designed for a specific task. Alternatively, CPU 710 may contain only a single general-purpose processing unit.

RAM 720 may receive instructions from secondary memory 730 using communication path 750. RAM 720 is shown currently containing software instructions, such as those used in threads and stacks, constituting shared environment 725 and/or user programs 726. Shared environment 725 includes operating systems, device drivers, virtual machines, etc., which provide a (common) run time environment for execution of user programs 726.

Graphics controller 760 generates display signals (e.g., in RGB format) to display unit 770 based on data/instructions received from CPU 710. Display unit 770 contains a display screen to display the images defined by the display signals. Input interface 790 may correspond to a keyboard and a pointing device (e.g., touch-pad, mouse) and may be used to provide inputs. Network interface 780 provides connectivity to a network (e.g., using Internet Protocol), and may be used to communicate with other systems (such as those shown in FIG. 1) connected to the network 104.

Secondary memory 730 may contain hard drive 735, flash memory 736, and removable storage drive 737. Secondary memory 730 may store the data software instructions (e.g., for performing the actions noted above with respect to the Figures), which enable digital processing system 700 to provide several features in accordance with the present disclosure.

Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EEPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable (storage) medium having stored therein computer software and/or data. However, the computer (or machine, in general) readable medium can be in other forms.

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 730. Volatile media includes dynamic memory, such as RAM 720. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus (communication path) 750. Transmission media can also take the form of acoustic or light waves, such as those generated during radio-wave and infra-red data communications.

In accordance with one or more exemplary embodiments of the present disclosure, a computer program product comprising a non-transitory computer-readable medium having a computer-readable program code embodied therein to be executed by one or more processors, said program code including instructions to: enable a user to record one or more videos by a video creating and editing module on a computing device; select one or more frames automatically from the one or more user recorded videos by the video creating and editing module; transfer the one or more automatically selected frames from the computing device to a server by the video creating and editing module over a network; receive the one or more automatically selected frames by a video processing module enabled in the server; detect and extract one or more objects from the one or more automatically selected frames by the video processing module; transfer the one or more extracted objects to the computing device by the video processing module over the network; receive the one or more extracted objects by the video creating and editing module and displaying the one or more extracted objects to the user on the computing device; place the one or more extracted objects on a new frame automatically by the video creating and editing module; allow the user to reposition the one or more extracted objects on the new frame by the video creating and editing module; and enable the user to customize background and foreground elements in the new frame to create virtual situations by the video creating and editing module.

According to an exemplary aspect of the present disclosure, enabling a user to record one or more videos by a video creating and editing module on a computing device.

According to an exemplary aspect of the present disclosure, displaying a series of frames to the user from the one or more user recorded videos by the video creating and editing module.

According to an exemplary aspect of the present disclosure, allowing the user to select one or more frames from the series of frames displayed on the computing device by the video creating and editing module.

According to an exemplary aspect of the present disclosure, transferring the one or more user selected frames from the computing device to a server by the video creating and editing module over a network.

According to an exemplary aspect of the present disclosure, receiving the one or more user selected frames by a video processing module enabled in the server.

According to an exemplary aspect of the present disclosure, detecting and extracting one or more objects from the one or more user selected frames by the video processing module.

According to an exemplary aspect of the present disclosure, transferring the one or more extracted objects to the computing device by the video processing module over the network.

According to an exemplary aspect of the present disclosure, receiving the one or more extracted objects by the video creating and editing module and displaying the one or more extracted objects to the user on the computing device.

According to an exemplary aspect of the present disclosure, enabling the user to select a new frame from the one or more user recorded videos by the video creating and editing module.

According to an exemplary aspect of the present disclosure, allowing the user to select and place the one or more extracted objects into the new frame by the video creating and editing module.

According to an exemplary aspect of the present disclosure, enabling the user to customize background and foreground elements in the new frame by the video creating and editing module.

According to an exemplary aspect of the present disclosure, deleting the one or more user selected frames after extracting the one or more objects and replacing one or more user selected frames with the new frame by the video creating and editing module.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

Although the present disclosure has been described in terms of certain preferred embodiments and illustrations thereof, other embodiments and modifications to preferred embodiments may be possible that are within the principles and spirit of the invention. The above descriptions and figures are therefore to be regarded as illustrative and not restrictive.

Thus the scope of the present disclosure is defined by the appended claims and includes both combinations and sub-combinations of the various features described hereinabove as well as variations and modifications thereof, which would occur to persons skilled in the art upon reading the foregoing description.

What is claimed is:

1. A method for extracting objects from videos in real-time to create virtual situations, comprising:
enabling a user to record one or more videos by a video creating and editing module on a computing device;
selecting one or more frames automatically from the one or more user recorded videos by the video creating and editing module;
transferring the one or more automatically selected frames from the computing device to a server by the video creating and editing module over a network;
receiving the one or more automatically selected frames by a video processing module enabled in the server;
detecting and extracting one or more objects from the one or more automatically selected frames by the video processing module;

transferring the one or more extracted objects to the computing device by the video processing module over the network;

receiving the one or more extracted objects by the video creating and editing module and displaying the one or more extracted objects to the user on the computing device;

placing the one or more extracted objects on a new frame automatically by the video creating and editing module;

allowing the user to reposition the one or more extracted objects on the new frame by the video creating and editing module; and enabling the user to customize background and foreground elements in the new frame to create virtual situations by the video creating and editing module.

2. The method of claim 1, comprising a step of enabling the user to access a camera icon to record the one or more videos on the computing device by a video recording module.

3. The method of claim 1, comprising a step of displaying a series of frames to the user from the one or more user recorded videos by a frame selection module.

4. The method of claim 1, comprising a step of allowing the user to select one or more frames from the series of frames displayed on the computing device by the frame selection module.

5. The method of claim 1, comprising a step of transferring the one or more user selected frames from the computing device to the server by the frame selection module.

6. The method of claim 5, comprising a step of receiving the one or more user selected frames from the frame selection module by a frames receiving module.

7. The method of claim 6, comprising a step of detecting and extracting the objects from the user selected frames by the objects extraction and classification module.

8. The method of claim 7, comprising a step of classifying the extracted objects into the appropriate categories by the objects extraction and classification module.

9. The method of claim 7, comprising a step of guiding the user selected one or more frames by inflection points in a background audio track used in the one or more videos.

10. The method of claim 7, comprising a step of guiding the user selected one or more frames by visual changes in the one or more videos (for example, a pause after a dance move).

11. The method of claim 7, comprising a step of transferring the extracted objects to the video creating and editing module by the objects extraction and classification module.

12. The method of claim 11, comprising a step of receiving and displaying the one or more extracted objects to the user by an objects displaying module.

13. The method of claim 1, comprising a step of enabling the user to select a new frame from the one or more user recorded videos by a new frame selection module.

14. The method of claim 12, comprising a step of allowing the user to select the one more extracted objects to transfer into the new frame to create the virtual situation by the objects selection module.

15. The method of claim 1, comprising a step of enabling the user to customize the background and foreground elements of the new frame by a background and foreground customization module.

16. The method of claim 15, comprising a step of enabling the user to upload their own assets while customizing the background and foreground elements.

17. The method of claim 1, comprising a step of enabling the existing user directly to access the video creating and editing module to create the virtual situations.

18. The method of claim 1, comprising a step of enabling the new user to watch a tutorial for creating virtual situations.

19. A system for extracting objects from videos in real-time to create virtual situations, comprising:

a computing device comprising a processor for executing instructions from a video creating and editing module stored in memory within the computing device, whereby the a video creating and editing module configured to enable a user to record one or more videos;

the video creating and editing module configured to select one or more frames automatically from the one or more user recorded videos, whereby the video creating and editing module configured to transfer the one or more automatically selected frames from the computing device to a server over a network;

the server comprising a video processing module configured to receive the one or more automatically selected frames, whereby the video processing module configured to detect and extract one or more objects from the one or more automatically selected frames and transfer the one or more extracted objects to the computing device over the network; and the video creating and editing module configured to receive one or more extracted objects and display the one or more extracted objects to the user on the computing device, whereby the video creating and editing module configured to place the one or more extracted objects on a new frame automatically, the video creating and editing module configured to allow the user to reposition the one or more extracted objects on the new frame, the video creating and editing module configured to enable the user to customize background and foreground elements in the new frame to create virtual situations.

20. The system of claim 19, wherein the video creating and editing module configured to display the series of frames to the user from the one or more user recorded videos.

21. The system of claim 19, wherein the video creating and editing module configured to allow the user to select one or more frames from the series of frames displayed on the computing device.

22. The system of claim 19, wherein the video creating and editing module configured to enable the user to select the new frame from the one or more user recorded videos.

23. The system of claim 19, wherein the video creating and editing module configured to allow the user to select and place the one or more extracted objects into the new frame.

24. The system of claim 19, wherein the video creating and editing module configured to delete the one or more user selected frames after extracting the one or more objects and replacing one or more user selected frames with the new frame.

25. The system of claim 19, wherein the video creating and editing module configured to select the one or more frames automatically from the one or more user recorded videos to create virtual situations on the computing device without the cloud server.

26. The system of claim 19, wherein the extracted objects comprises a human body, animals, and other objects in real-time from one or more frames of the video.

27. The system of claim 19, wherein the new frame comprises a movie poster, a movie scene, a movie song ending, movie trailers, video memes, brand interactions, and virtual landscapes.

28. A computer program product comprising a non-transitory computer-readable medium having a computer-readable program code embodied therein to be executed by one or more processors, said program code including instructions to:

enable a user to record one or more videos by a video creating and editing module on a computing device;

select one or more frames automatically from the one or more user recorded videos by the video creating and editing module;

transfer the one or more automatically selected frames from the computing device to a server by the video creating and editing module over a network;

receive the one or more automatically selected frames by a video processing module enabled in the server;

detect and extract one or more objects from the one or more automatically selected frames by the video processing module;

transfer the one or more extracted objects to the computing device by the video processing module over the network;

receive the one or more extracted objects by the video creating and editing module and displaying the one or more extracted objects to the user on the computing device;

place the one or more extracted objects on a new frame automatically by the video creating and editing module;

allow the user to reposition the one or more extracted objects on the new frame by the video creating and editing module; and enable the user to customize background and foreground elements in the new frame to create virtual situations by the video creating and editing module.

* * * * *